(No Model.)
J. S. S. TIDD & F. O. CLAFLIN.
Adjustable Handle for Kettles.
No. 230,447. Patented July 27, 1880.
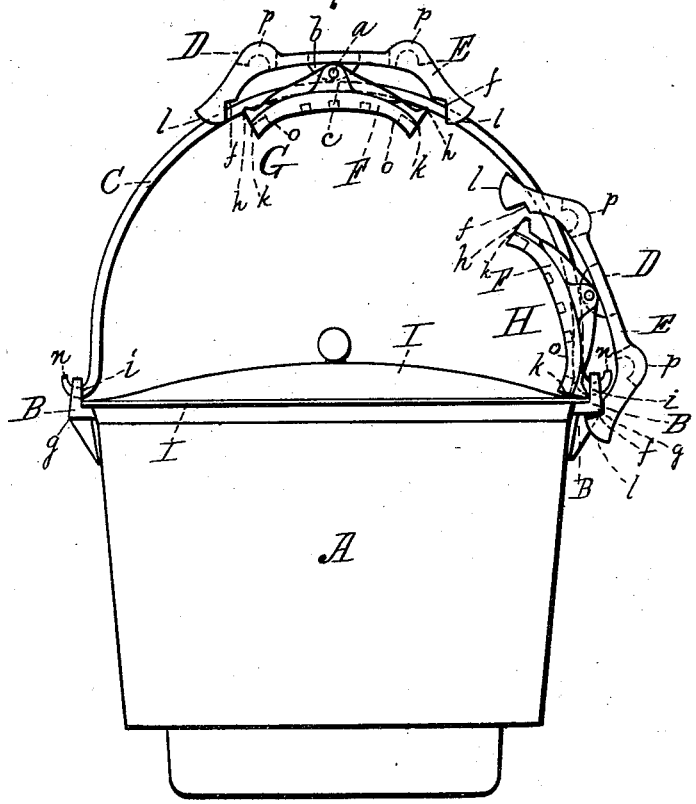
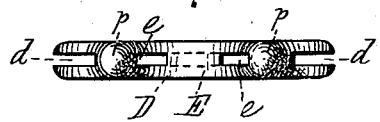
Witnesses,
John N. Fairbanks
W. Trowbridge Forbes.
Inventors,
James S. S. Tidd
Frank O. Claflin

UNITED STATES PATENT OFFICE.

JAMES S. S. TIDD AND FRANK O. CLAFLIN, OF WESTBOROUGH, MASS.

ADJUSTABLE HANDLE FOR KETTLES.

SPECIFICATION forming part of Letters Patent No. 230,447, dated July 27, 1880.

Application filed May 17, 1880. (No model.)

*To all whom it may concern:*

Be it known that we, JAMES S. S. TIDD and FRANK O. CLAFLIN, both of Westborough, in the county of Worcester and State of Massachusetts, have invented an Adjustable Handle for Kettles; and we do hereby declare that the following is a full, clear, and exact description of the same, reference being had to the accompanying drawings, forming a part of this specification, and in which—

Figure 1 represents a side view of an ordinary iron kettle, such as is commonly used for culinary purposes, showing one of our adjustable handles applied to the same, which will be hereinafter more fully described. Fig. 2 represents a top or plan view of our aforesaid adjustable handle when removed from the bail of the kettle; and Fig. 3 represents the under side of said handle.

To enable those skilled in the art to which our invention belongs to make and use the same, we will proceed to describe it more in detail.

In the drawings, A represents an ordinary cast-iron kettle, such as is commonly used for cooking vegetables, meats, &c. B B represent its ears, to which are hinged the ends of wire bail or handle C in the usual manner.

Our adjustable handle D is made in two parts, E and F, and said parts are hinged together by means of a pin, $a$, a flange, $b$, being formed upon the under side of the part E, which fits between two ears or projections, $c\,c$, formed upon the upper side of the part F, as is fully represented by the drawings. Said parts E and F are slotted upon their inner sides, as represented at $d$, Figs. 2 and 3, so that they may fit over the wire bail C, as shown in Fig. 1. Slots are also formed in said parts E and F at the points $e$, to lighten the same.

The handle D is represented at G in proper position for raising and carrying the kettle A, and at H for pouring or emptying out its contents. When the handle is in the last-named position the notched portions $ff$ of the part E bear upon the lower corner, $g$, of ear B, while the ends $h\,h$ of the part F bear upon the inner side, $i$, of said ear. Therefore, when the handle is grasped and the parts E and F thereby drawn together, it will be seen that the kettle is held in a very firm and secure manner, and is effectually prevented from turning as the contents are poured out, by said set of notches $ff$ and ends $h\,h$ bearing upon the square surfaces of the ear B, and also by the curve of handle D being greater than the curve of the wire bail C.

The curve of handle D being greater than that of bail C, as above stated, also prevents said handle turning at any point upon the bail, thus always keeping it in its proper upright position, ready to be grasped by the hand.

In pouring out the contents or liquid portions thereof from the kettle, the cover I is prevented from falling off by the ends $k\,k$ of part F bearing upon and holding its outer edge, as represented in Fig. 1.

When the hand is released upon handle D (after having carried the kettle to the point desired) said handle slides down over the surface of bail C, and as the curved ends $l\,l$ of the part E strike the top of ear B, said part is swung out, thereby allowing the handle to drop down over the ear and lock, as shown in Fig. 1. To facilitate said adjustment of handle D to ear B the inner sides of the ends of the part E are also curved, as represented at $m\,m$, Fig. 3, so as not to catch onto the end $n$ of the bail C.

The ends of handles D are constructed alike, so that they may be used upon either side of the kettle to which they are attached. They may be made of any suitable material, and of any form required to fit the same to the ears of the kettle. They may also be employed upon any other form or style of kettle to which they are adapted without departing from the principle of our invention.

From the foregoing description it will be seen that a kettle provided with an adjustable handle, such as hereinbefore shown and described, may be much more easily handled, and with less liability of the person using the same being scalded in pouring out its contents, than by the use of a wire bail only upon said kettle.

The peculiar form and construction of the parts E and F produce an easy-fitting surface for the hand, while at the same time a very firm hold may be obtained by means of the curved parts o o and hubs p p, formed upon said parts.

Having described our adjustable handles for kettles, what we claim therein as new and of our invention, and desire to secure by Letters Patent, is—

1. An adjustable handle, D, for kettles, composed of two hinged parts, E and F, constructed and arranged substantially as shown and described, and for the purposes set forth.

2. The combination, with the wire bail or handle C, ears B B, and cover I of a kettle, A, of hinged parts E and F and pin a, constructed, arranged, and operating substantially as and for the purposes set forth.

JAMES S. S. TIDD.
FRANK O. CLAFLIN.

Witnesses:
JOHN W. FAIRBANKS,
W. TROWBRIDGE FORBES.